United States Patent [19]

Hattori et al.

[11] 4,338,081
[45] Jul. 6, 1982

[54] TORQUE TRANSMISSION BELT MEANS

[75] Inventors: Yoshiyuki Hattori, Toyoake; Kazuma Matsui, Toyohashi; Hiroji Kinbara, Aichi, all of Japan

[73] Assignee: Nippondenso Co., Ltd., Kariya, Japan

[21] Appl. No.: 151,155

[22] Filed: May 19, 1980

[30] Foreign Application Priority Data

Jun. 8, 1979 [JP] Japan .................................. 54/72785

[51] Int. Cl.³ ................................................ F16G 5/00
[52] U.S. Cl. ................................. 474/201; 474/272; 474/903
[58] Field of Search ............... 474/201, 242, 244, 247, 474/265, 272, 904

[56] References Cited

U.S. PATENT DOCUMENTS

| 720,340 | 2/1903 | Fouillaron | 474/201 |
| 811,794 | 2/1906 | Riddell | 474/201 |
| 962,563 | 6/1910 | Foster et al. | 474/201 |
| 3,720,113 | 3/1973 | Van Doorne et al. | 74/236 |
| 3,949,621 | 4/1976 | Beusink | 474/201 |
| 4,080,841 | 3/1978 | Vollers | 474/201 |

FOREIGN PATENT DOCUMENTS

| 849944 | 7/1952 | Fed. Rep. of Germany | 474/201 |
| 7900435 | 7/1980 | Netherlands | 474/201 |
| 256918 | 9/1948 | Switzerland | 474/201 |
| 1329 | of 1907 | United Kingdom | 474/201 |

OTHER PUBLICATIONS

European Patent Application No. 862, published 2/1979, Inventor: Hendriks.

Primary Examiner—C. J. Husar
Assistant Examiner—Conrad Berman
Attorney, Agent, or Firm—Cushman, Darby & Cushman

[57]  ABSTRACT

A torque transmission belt means which is extended between a driving pulley and a driven pulley for transmitting a driving force from the driving pulley to the driven pulley.

The torque transmission belt means comprises a plurality of ring-shaped metallic strips which are superimposed on each other, and two kinds of blocks which are arranged along the metallic strips so as to be shiftably engaged therewith.

Only one kind of blocks are contacted with said pulleys and the other kind of blocks are bevelled on opposed surfaces facing to the direction of the movement so that they can tilt with respect to one kind of blocks when they are entrained around the pulleys.

5 Claims, 11 Drawing Figures

TORQUE TRANSMISSION BELT MEANS

BACKGROUND OF THE PRESENT INVENTION

The present invention relates to a torque transmission belt which extends around a drive pulley and a driven pulley for transmitting a driving force from the drive pulley in the driving side to the driven pulley.

Conventionally, such a transmission belt comprises a plurality of stacked ring-shaped metallic strips and a series of blocks which are shiftably engaged by the metallic strips. U.S. Pat. No. 3,720,113 discloses an example of such a conventional transmission belt. In the transmission belt of U.S. Pat. No. 3,720,113, one or both sides of each of the blocks is bevelled transversely to the direction of movement so that the blocks can tilt with respect to each other when they pass around pulleys. The remaining sides of each of the blocks are inclined so as to coincide with the angle of inclination of the pulleys.

One object of the present invention is to provide an improved torque transmission belt of the above described type.

Another object of the present invention is to provide a torque transmission belt of light weight.

A further object of the present invention is to provide a torque transmission belt which prevents excessive noise from being generated during the operation thereof.

A still further object of the present invention is to provide a torque transmission belt which can be produced with ease.

DESCRIPTION OF THE DRAWINGS

Other objects and advantages of the invention will become apparent from the following description of preferred embodiments thereof, together with reference to the accompanying drawings wherein.

DETAILED DESCRIPTION

Figure 1:
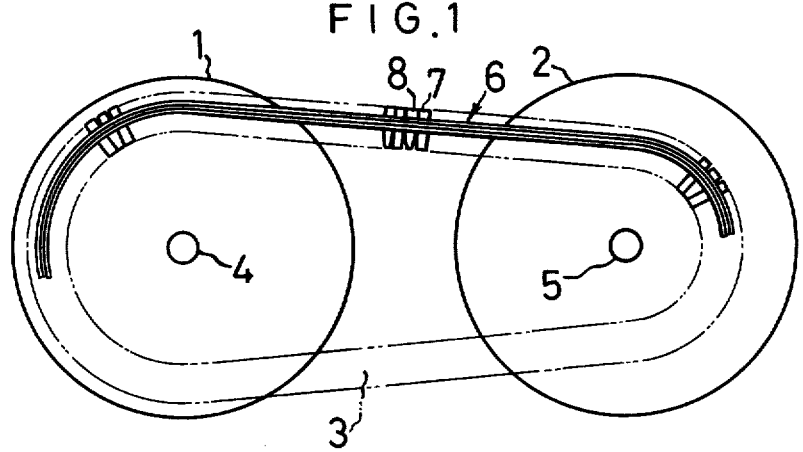
FIG. 1 is a schematic illustration of a first embodiment of a torque transmission belt according to the present invention.

In FIG. 1, a drive pulley 1 is connected to a shaft 4, such as that of an engine. Thus, the pulley 1 is rotated by the driving force of the engine. The rotation of the pulley 1 is transmitted to drive a pulley 2 through a torque transmission belt 3 so that pulley 2 and an associated operating shaft 5 of auxiliary machinery, such as a compressor, an alternator or an air pump, are rotated.

The torque transmission belt 3 consists of a series of blocks 7 and 8, which are alternately arranged with respect to each other and rings 6 made of metallic material having excellent bending and tensile strength. The series of blocks are linked together by the rings 6.

Figure 2:
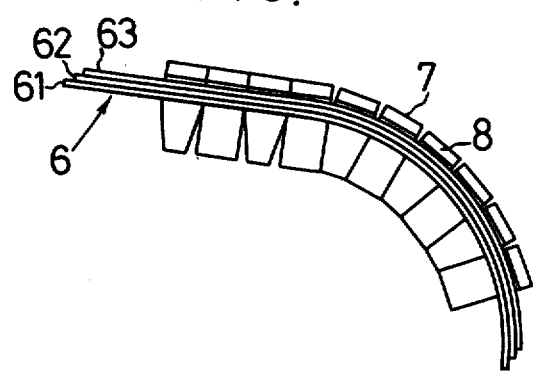
FIG. 2 is an enlarged view of one portion of the belt shown in FIG. 1.

As shown in FIG. 2, each ring 6 comprises three superimposed metal strips 61, 62 and 63 so as to improve the tensile strength of the ring.

Figure 3:
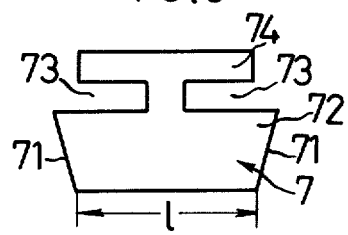
FIG. 3 is a front view of a main block 7 shown in FIG. 1.
Figure 4:
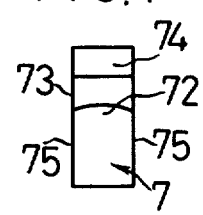
FIG. 4 is a side view of the block shown in FIG. 3.
Figure 5:
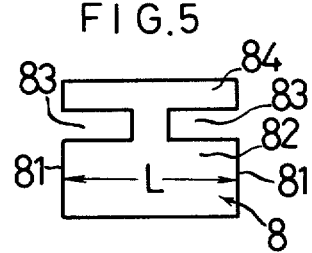
FIG. 5 is a front view of a secondary block 8 shown in FIG. 1.
Figure 6:
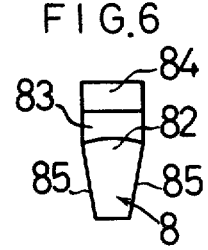
FIG. 6 is a side view of the block shown in FIG. 5.

The block 7 (hereinafter called "main block") is made of material having high strength, such as tool steel. As shown in FIGS. 3 and 4, in both sides of each of the main blocks 7, grooves 73 are provided between a base portion 72 and a head portion 74. A ring 6, composed of the metal strips 61, 62 and 63 is slidably inserted within each of the grooves 73.

Opposed side surfaces 75 of the base portion 72 of the main block 7 extending in the direction of the movement of the rings 6 are formed parallel to one another. The remaining opposed side surfaces 71 of portion 72 are inclined in such a manner as to reduce the distance therebetween on the inner surface of the belt.

Figure 7:
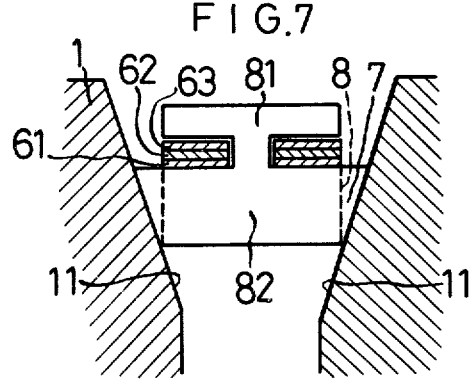
FIG. 7 is a cross-sectional view of the blocks 7 and 8 engaging a pulley.

The inclined side surfaces 71 contact inclined surfaces 11 which form a V-shaped groove in the pulley 1, as shown in FIG. 7, and inclined surfaces (not shown) which form a corresponding V-shaped groove in pulley 2.

In the secondary blocks 8, grooves 83 are provided between a base portion 82 and a head portion 84 for receiving the rings 6. The grooves 83 have the same shape as grooves 73.

Opposed side surfaces 85 of the base portion 82 of each of the secondary blocks 8 extending transversely to the moving direction are inclined in such a manner that the distance therebetween is reduced on the inner surface of the belt. By so inclining the side surfaces 85 of the secondary blocks 8, the main blocks 7 and the secondary blocks 8 can tilt with respect to one another when they pass around the pulleys 1 and 2.

The remaining opposed side surfaces 81 of each base portion 82 of block 8 are formed parallel to one another.

The width L of the base portion 82 of the secondary block 8 is formed slightly shorter than the width l of the base end of portion 72 of the main block 7.

Therefore, the side surfaces 81 of blocks 8 do not contact the inclined surfaces of the V-shaped grooves of the pulleys 1 and 2.

The torque transmission belt 3 just described extends between the drive pulley 1 and the driven pulley 2. Accordingly, rotation of pulley 1 is transmitted the pulley 2 through the main blocks 7, the secondary blocks 8 and the rings 6.

By forming the main blocks 7 and the secondary blocks 8 as described above, the torque transmission belt of the present invention has following operation effects:

(1) Since the secondary blocks 8 do not contact the inclined surfaces of pulleys 1 and the 2, only the main blocks 7 are used as the means of transmitting torque from pulley 1 to pulley 2. Consequently, the secondary blocks 8 are not required to have such a high strength as the main blocks 7.

Therefore, the secondary blocks 8 can be made of non-metallic material having excellent compression resistance, such as synthetic resin, carbon graphite, synthetic resin containing carbon graphite fibers, and hard rubber so that the weight of the torque transmission belt can be reduced.

As a result, the torque transmission belt of the present invention can be effectively applied to pulleys which rotate at high speed.

(2) Since the secondary blocks 8 can be made of synthetic resin or the like as described above, noise occurring when the metallic main blocks 7 and the secondary blocks 8 contact one another during the rotation of the torque transmission belt becomes small.

As a result, the torque transmission belt operates silently.

(3) The main blocks 7 can be easily made of metal by forming inclined surfaces on the opposed side surfaces 71 only.

FIG. 8 to FIG. 11 illustrate a modified embodiment of the present invention.

Figure 8:
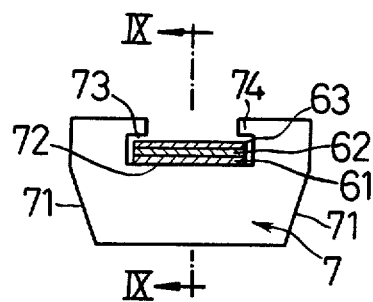
FIG. 8 is a front view of the main block 7 of a modified embodiment of the present invention.
Figure 9:
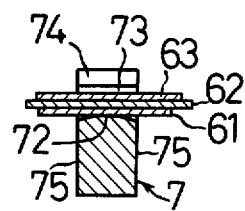
FIG. 9 is a sectional view taken along line IX—IX of FIG. 8.
Figure 10:
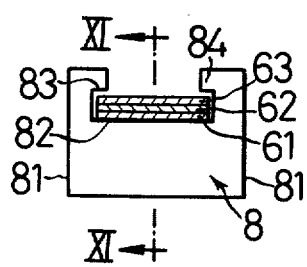
FIG. 10 is a front view of the secondary block 8 of a modified embodiment of the present invention.
Figure 11:
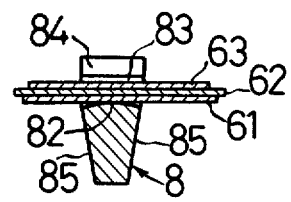
FIG. 11 is a sectional view taken along the line XI—XI of FIG. 10.

As shown in FIGS. 8 and 10, grooves 73 and 83 are perforated in the upper portions of the main blocks 7 and secondary blocks 8, respectively, for receiving the metal strips 61, 62 and 63 of a ring 6.

The other constructional features of blocks 7 and 8 of this modified embodiment are similar to those of the previously described embodiment, and the same operational effects are achieved.

With a torque transmission belt according to the present invention, it is not always required that the spaced sides of blocks 8 be parallel to one another. If they do not contact the surfaces of the pulleys 1 and 2, they can be shaped in any other form.

Furthermore, the main blocks 7 can be made of material other than tool steel if it has the sufficient strength and abrasion resistance required in torque transmitting means of this type.

The secondary blocks 8 also can be made of materials other than described above provided it is lighter than that of the main block 7 and has sufficient compression resistance so as to be resistant to the pressing forces applied from the ring(s) 6 and the main block 7.

What is claimed is:

1. A torque transmission belt extending between a drive pulley and a driven pulley and movable to transmit a driving force from said drive pulley to said driven pulley, comprising:

a plurality of metallic strips superimposed on each other to form at least one ring;

a series of blocks arranged along said ring and shiftably engaged therewith;

said series of blocks being composed of two kinds of blocks alternately arranged along said strips;

one kind of blocks being made of metal and having opposed side surfaces extending in the direction of movement of the belt, said surfaces including portions which are substantially parallel to one another and remaining portions which are inclined so as to contact surfaces of V-shaped grooves of said pulleys;

the other kind of blocks being made of a non-metallic compression-resistant material which is lighter than that of said one kind blocks and having opposed side surfaces extending transversely of the direction of movement of the belt, said surfaces including portions which are inclined so that the distance therebetween is decreased toward the inside surface of said belt, said blocks having additional opposed side surfaces extending in the direction of movement which do not contact said surfaces of the V-shaped grooves of said pulleys.

2. A torque transmission belt means according to claim 1, wherein;

said the other kind of blocks is made of carbon graphite.

3. A torque transmission belt means according to claim 1, wherein:

said the other kind of blocks is made of synthetic resin.

4. A torque transmission belt means according to claim 1, wherein:

said the other kind of blocks is made of synthetic resin containing carbon graphite fibers.

5. A torque transmission belt means according to claim 1, wherein:

said the other kind of blocks is made of hard rubber.

* * * * *